No. 746,638. Patented December 8, 1903.

UNITED STATES PATENT OFFICE.

OSCAR LIEBREICH, OF BERLIN, GERMANY.

FATTY SUBSTANCE AND PROCESS OF MAKING SAME.

SPECIFICATION forming part of Letters Patent No. 746,638, dated December 8, 1903.

Original application filed June 7, 1901, Serial No. 63,637. Divided and this application filed June 12, 1903. Serial No. 161,230. (No specimens.)

*To all whom it may concern:*

Be it known that I, OSCAR LIEBREICH, medical doctor, a citizen of the German Empire, residing at Berlin, Germany, have invented certain new and useful Improvements in Fatty Substances and Processes of Making Same, of which the following is a specification.

This invention relates to new fatty substances containing fats, fatty acids, or fat-like substances of any origin inclusive of animal, vegetable, and mineral origin, or compounds of the same, and to the process of manufacturing them.
The new fatty substances consist of fats, fatty acids, or fat-like substances of any origin, inclusive of animal, vegetable, and mineral origin, or arbitrary combinations of these substances in admixture with acidylated derivatives of aromatic bases, in which the acid radical contains more than ten atoms of carbon. These admixtures show, substantially, all the properties of the fatty compounds contained in the same, which make these fatty compounds adaptable for the manufacture of candles, wax-colors, unguents, hydrophile salves, and other articles; but besides these properties they have a higher melting-point and are more capable of absorbing water than the said fatty compounds themselves. Therefore these new fatty substances form a good raw material for the manufacture of candles, wax-colors, hydrophile salves—that is to say, salves which have the property of absorbing water, unguents, &c. Let it be borne in mind that by the term "fat-like" substances used in its extensive sense in the specification and claims, aside from the "improved" fatty substances, I mean to include not only true fats, but substances, whether fatty acids or other fat-like substances, such as vaseline or paraffin, which have the general properties or characteristics of fats, for the purpose as will be apparent from this description.

The new fatty substances may be obtained either by mixing fats, fatty acids, fat-like substances, or combinations thereof, with acidylated derivatives of aromatic bases, which have been produced in separate processes, or the mixture containing fats, fatty acids, &c., may be produced simultaneously with the production of the acidylated derivatives of the aromatic base or bases.

The process of producing the acidylated derivatives of the aromatic base or bases is disclosed in a separate divisional application filed April 28, 1903, Serial No. 154,702.

In forming a mixture of a fatty substance consisting of fats, fatty acids, fat-like substances, or combinations of the same with acidylated derivatives of aromatic bases I prefer to melt the said bodies together at a suitable temperature. Examples are hereinafter given.

If it is intended to produce the acidylated derivatives of aromatic bases simultaneously with the mixture with fats, fatty acids, fat-like substances, or combinations thereof, I may heat a mixture of fats, fatty acids, &c., in excess with aromatic bases for a lengthy period in a closed or open vessel. By the reaction of the aromatic bases with the fats, &c., acidylated derivatives of the aromatic bases are formed, whereas the excess of the fats, fatty acids, fat-like substances, or combinations thereof remains in unaltered condition in mixture with the said formed acidylated derivatives. This latter process forms the subject of a separate application, filed June 7, 1901, Serial No. 63,637, of which this application is a division. Special claims for the process and product involving the employment of a fat-like substance of mineral origin are contained in a separate divisional application filed 25th day of July, 1903, Serial No. 166,969.

The aromatic bases, which among others may be used, are: 1, anilin; 2, bases of the naphthalene series; 3, aromatic diamines; 4, monoalkoyl derivatives of the bases named in Nos. 1 to 3; 5, homologues of the bases named in Nos. 1 to 3 and of the monoalkoyl derivatives of same.

The following examples show the changes the fats, &c., undergo when same are mixed with acidylated derivatives of aromatic bases.

1. Paraffin with melting-point 40° to 41° is raised by an admixture of ten per cent. anilid of stearic acid (melting-point 85°) to a melting-point of 68°.

2. Vaseline, which is clearly molten at 29°, melts after admixture of twenty per cent. anilid of stearic acid at 76° after an admixture of ten per cent. of the same anilid at 70°.

3. Olive-oil absorbs twenty per cent. of water after an admixture of ten per cent. anilid of stearic acid.

4. Eighty parts of stearic acid (melting-point 52°) and twenty parts of benzidid of stearic acid are melted together. The resulting product has a melting-point of 165°.

5. Eighty parts of stearic acid and twenty parts of p-toluidid of stearic acid are melted together. The resulting product has a melting-point of 65°.

6. Eighty parts of stearic acid and twenty parts of β-naphthylamid of stearic acid are melted together. The resulting product shows a melting-point of 77°.

7. Ninety parts of stearic acid and ten parts of m-phenylendiamid of stearic acid are melted together. The resulting product has a melting-point of 85°.

8. Seventy parts of paraffin (melting point 40° to 42°) and thirty parts of m-phenylendiamid of stearic acid are melted together. The product has a melting-point of 104°.

9. One hundred parts of stearic acid and sixteen twenty-fifths parts of anilin (half the quantity which theoretically is necessary for the complete conversion of the stearic acid) are heated for fifteen hours at 200°. The resulting product, which is a mixture of stearic acid and anilid of stearic acid, has without further purification a melting-point of 68°. The acidylated derivatives which seem to give most promise in this invention are those in which the acid radical contains more than ten atoms of carbon.

Other substances may be added to the mixture of fats, &c., with acidylated derivatives of aromatic bases, especially substances of such kind as are adapted to assist the application of the product. I may add, for instance, to mixtures which are to be used for the manufacture of candles odorous substances, or to mixtures for salves I may add healing or sterilizing or other medical substances.

Having thus described my invention, what I claim is—

1. The process of making improved fatty substances, which consists in mixing an acidylated derivative of an aromatic base, in which the acid radical contains more than ten atoms of carbon, with a fat-like substance, for substantially the purposes set forth.

2. The process of making improved fatty substances, which consists in mixing an acidylated derivative of an aromatic base, in which the acid radical contains more than ten atoms of carbon, with a fat-like substance of an origin other than mineral origin, for substantially the purposes set forth.

3. As a new product, an improved fatty substance containing a mixture of a fat-like substance and an acidylated derivative of an aromatic base in which the acid radical contains more than ten atoms of carbon, the said new product being characterized by a substantially higher melting-point than that of the fat-like substance itself, for substantially the purposes set forth.

4. As a new product, an improved fatty substance, containing an acidylated derivative of an aromatic base, in which the acid radical contains more than ten atoms of carbon, and a fat-like substance, for substantially the purposes set forth.

5. As a new product, an improved fatty substance, containing an acidylated derivative of an aromatic base, in which the acid radical contains more than ten atoms of carbon, and a fat-like substance of an origin other than mineral origin, for substantially the purposes set forth.

6. As a new product, an improved fatty substance, containing fatty acids or esters and an acidylated derivative of an aromatic base, the acid radical of which belongs to the higher fatty acids with more than ten atoms of carbon in one molecule, for substantially the purposes set forth.

In testimony whereof I have signed this specification in the presence of two subscribing witnesses.

OSCAR LIEBREICH.

Witnesses:
HENRY HASPER,
WILLIAM MAYNER.